Nov. 10, 1936.   H. BRISACHER   2,060,723
VALVE CONTROLLING MEANS
Filed Sept. 28, 1933   2 Sheets-Sheet 1

INVENTOR.
HUGO BRISACHER.
BY
ATTORNEY.

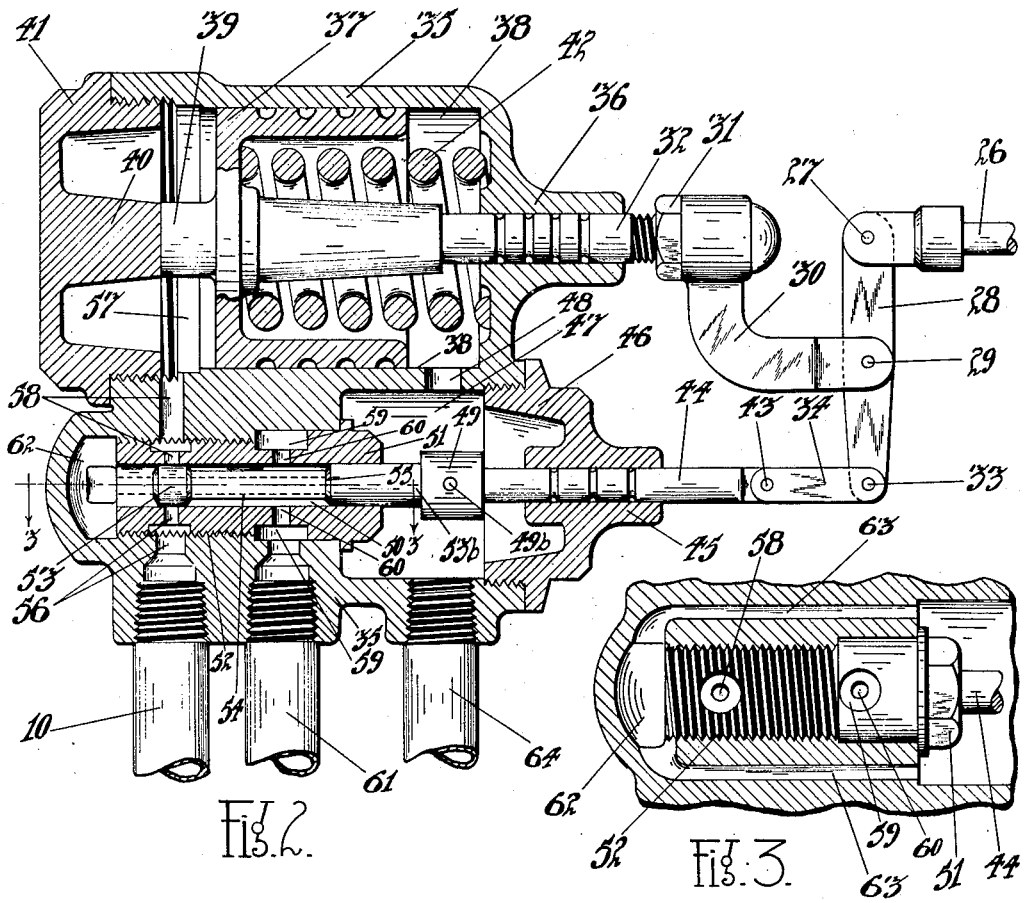

Patented Nov. 10, 1936

2,060,723

UNITED STATES PATENT OFFICE 2,060,723

VALVE CONTROLLING MEANS

Hugo Brisacher, Rutherford, N. J., assignor to Kieley & Mueller, Inc., New York, N. Y., a corporation of New York Application September 28, 1933, Serial No. 691,315

4 Claims. (Cl. 137—153)

My invention relates to a valve controlling means and is in the nature of a pilot valve adapted to adjust and maintain the position of a valve in a pressure or fluid flow line.

One of the principal objects of my invention lies in the provision of a valve controlling means which is sensitive to slight changes and which translates such changes smoothly and evenly to the main valve.

Heretofore controlling means for valves have generally been of the type which upon changing conditions affecting the operation of the valve, have caused the main valve to either abruptly close completely or open, and without provision for maintaining the open position of the main valve in variable adjusted positions.

My invention is particularly adaptable for use in connection with pressure lines or fluid flow lines where a given pressure or flow through the line is desired to be maintained.

The actuating means for my improved controlling device may be either pressure or liquid level but for convenience of illustration I have shown the same as a liquid level actuating means only.

Another object of my invention lies in the provision of a floating control means for the pilot or control valve.

A still further object lies in the provision of a very simple and inexpensive apparatus which is entirely automatic in its operation and which requires no packing material around the moving parts as any leakage past the same is automatically compensated for by the mechanism to be described.

Other specific objects and advantages will be apparent as the description proceeds, reference now being had to the figures of the accompanying drawings forming a part of this application and wherein like reference numerals indicate like parts.

In the drawings:

Figure 2 is a detail cross sectional view of the controlling device.

Figure 3 is a detail sectional view taken on the line 3—3 of Figure 2.

Figure 1:
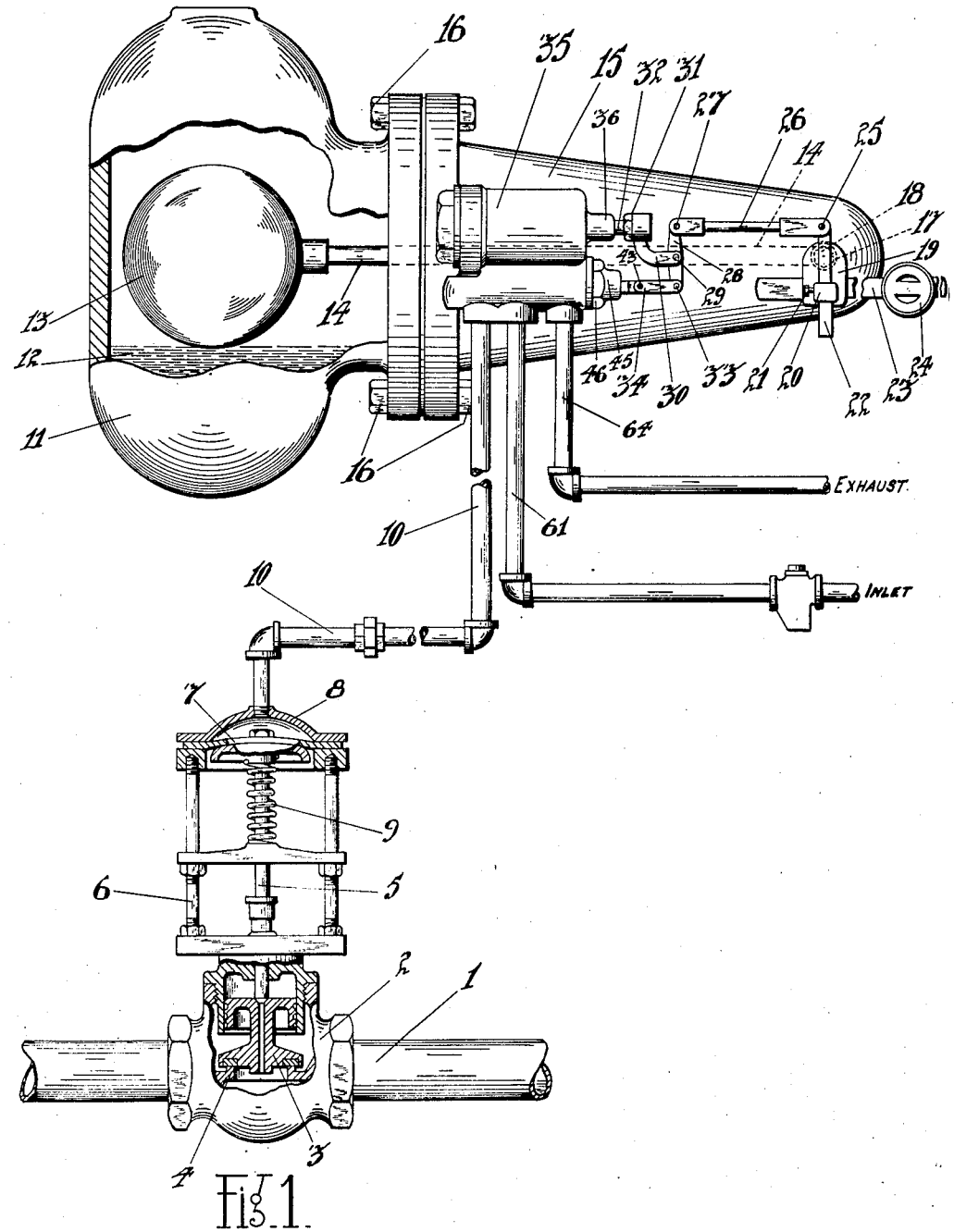
Figure 1 is a diagrammatic view partly in section illustrating one application of my invention.

The reference character 1 refers to a pressure or fluid flow line interposed in which is a main valve casing 2 containing the valve 3 cooperating with valve seat 4 to regulate the flow in the line 1. The stem 5 of the valve 3 passes upwardly through the valve casing, guided by the frame 6 and is suitably attached at its upper end to a diaphragm 7 in the casing 8 suitably mounted upon the upper end of the frame 6. A coil spring 9 normally urges the stem 5 and valve 3 upwardly in valve opening direction. A pressure line 10 communicates with the casing 8 on the upper side of the diaphragm 7, the pressure from such line tending to force the valve stem and valve downwardly towards valve closing position. Obviously therefore, the balance between the spring 9 and the pressure from the line 10 on the upper side of the diaphragm 7 determines the position of the valve 3 with respect to the seat 4 and consequently the flow through the line 1. My invention comprises means for controlling the pressure in line 10, responsive to certain conditions governed either by the pressure or flow through line 1 or independent thereof, whereby such flow is smoothly and quickly controlled by adjustment of the position of the valve 3.

The reference character 11 refers to a casing or tank adapted to receive a fluid 12 and within which is supported a float 13, the position of which is determined by the level of the liquid within the tank 11. The float 13 is mounted on one end of a float arm 14 which passes through an extension 15 suitably secured as at 16 to the tank 11. The opposite end of the float arm 14 is connected to a rock shaft 17 suitably supported within the extension 15 adjacent its rear end. One end of the rock shaft 17 projects through the side of the casing extension 15 and has secured thereto as at 18 a bracket 19 secured to which, as by the sleeve 20 and set screw 21, is an arm 22. Also attached to the bracket 19 is a balancing arm 23 upon which is suitably adjustably mounted a weight 24 whereby a rough balance may be provided for the weight of the float 13.

The upper end of the arm 22 is pivoted as at 25 to one end of a rod 26, the opposite end of which is pivotally secured as at 27 to one end of a floating link 28 pivoted intermediate its ends as at 29 to one end of a bracket 30 secured as at 31 to one end of a piston rod 32. The opposite end of the link 28 is pivoted as at 33 to one end of a link 34.

Suitably mounted directly adjacent and preferably attached to the casing extension 15 is a casing 35 within which are positioned the parts associated with the links 26, 28 and 34. The piston rod 32 enters the upper portion of the casing 35 through a boss 36 provided on the end thereof and carries at its opposite end a piston 37 having close sliding engagement with the inner walls 38 of such casing. A projecting stop lug 39 is provided on the end of the piston for engagement with a boss 40 provided on the inside of the removable cap or closure 41 closing the end of the piston chamber opposite the boss 36. These lugs cooperate to limit the movement to the left in Figure 2 of the piston 37. A coil spring 42 encircles the piston rod 32 between the boss 36 and the inner surface of the piston head 37, thus normally urging the piston to the left in Figure 2.

The inner end of the link 34 is pivotally connected as at 43 with a slidable valve stem 44 which passes through a boss 45 on a removable closure cap 46 closing one end of a chamber 47 formed in the lower part of the housing 35. This chamber communicates with the piston chamber behind the piston 37 in the upper portion of the casing 35 by means of the port 48. The valve stem 44 is provided with a collar 49 within the chamber 47 to limit the movement to the right in Figure 2 of such valve stem, the same cooperating with the inner end of boss 45 for this purpose. This collar may be an integral enlargement of the stem 44 or fastened thereto as at 49b. The inner end of the valve stem 44 extends into an opening 50 within a plug 51 removably mounted as by the screw threads 52 within a recessed portion of the lower part of the casing 35, said plug and the opening 50 therethrough being in longitudinal alignment and registry with the valve stem 44. The inner end of the valve stem 44 is provided with a valve member 53 having a close sliding fit within the opening 50 and a portion of the valve stem 44 lying within the confines of the plug 51 is reduced in diameter as at 54 to provide a free space around such stem within the opening 50 between the valve 53 and the shouldered portion 55 of the stem.

The opening 50 in the plug 51 communicates with the pressure line 10 through ports 56. Communication is also provided between the opening 50 and the space 57 in front of the piston 37 by means of the ports 58. The ports 56 and 58 are in direct alignment and registry with each other so that the valve 53 cooperates with both equally and simultaneously.

The plug 51 is provided around its outer surface with a groove 59 communicating with the opening 50 around the reduced valve stem by a plurality of ports 60. This groove 59 also has communication with an inlet pipe 61 as shown clearly in Figure 2. Thus pressure from any suitable source may be admitted to the opening 50 around the reduced portion 54 of the valve stem 44 behind the valve 53.

A chamber 62 is provided in the casing 35 directly adjacent the inner end of the plug 51, the opening 50 through such plug communicating with such chamber. This chamber 62 also has communication with the exhaust chamber 47 through the medium of channels or ports 63 (see Figure 3).

Thus it is obvious that when the valve 53 is moved to the right in Figure 2, the ports 58 and 56 communicating respectively with the chamber 57 in front of the piston and the pressure line 10, are opened to the chamber 62 and the exhaust chamber 47 through the ports 63. An exhaust pipe 64 carries the exhaust to any desired chamber or to the atmosphere.

The removable plug 51 which serves as bushing and bearing for the slidable valve stem 44 and its valve 53 is an important feature of my invention as it provides a means for easily and quickly assembling the parts and for permitting ready access to the sliding valve and ports for cleaning.

The operation of my invention is as follows:

It will be assumed that the valve 3 in the line 1 is open, that is, raised above its seat 4. It is also assumed that either by some means under the control of the flow through the line 1, or means independent thereof, the liquid level in the tank 11 rises. Obviously this raises the float 13 which movement rocks the shaft 17, thus pulling the link 26 to the right in Figures 1 and 2. This results in rocking the link 28 about the pivot 29 which causes the valve stem 44 to move to the left in Figure 2 until the valve 53 uncovers the ports 56 and 58, thus admitting pressure from the inlet 61 through port 60 and the opening 50 to both the diaphragm 7, through the line 10, and to the piston chamber 57 ahead of the piston 37. Such pressure serves to force the diaphragm 7 downwardly, thus moving the valve 3 toward closing position. The pressure admitted in front of the piston 37 serves to move such piston to the right in Figure 2 against the tension of the spring 42. This movement of the piston 37 also serves to move to the right in Figure 2 the piston rod 32 and the bracket 30. This movement of the bracket 30 now rocks the link 28 on the pivot 27, which latter is relatively fixed because of its relation to the float and the link 26, thus moving the link 34 and valve stem 44 to the right in Figure 2, which causes the valve 53 to again cover the ports 56 and 58 thereby stopping the admission of pressure to the diaphragm 7 and to the piston chamber 57. If the liquid level in the tank 11 continues to rise, the same operations as just described are repeated until the valve 3 is entirely closed.

If now a drop in the liquid level in the tank 11 occurs the float 13 moves downwardly causing a rocking of the shaft 17 in the opposite direction and consequent movement of the link 26 to the left in Figures 1 and 2 resulting in rocking the link 28 on the pivot 29 in the opposite direction to that before described, thus moving the link 34 and the valve stem 44 to the right in Figure 2 until the valve 53 uncovers the ports 56 and 58 on the opposite side of the valve 53 from that previously described. In such positions, it is obvious that the pressure in front of the piston 37 and on the diaphragm 7 will now be released through such ports 56 and 58 and through the extreme left end portion of the opening 50 in the plug 51 to the chamber 62 and thence through the passages 63 to the exhaust chamber 47 and exhaust pipe 64. As soon as this occurs the pressure is relieved on the diaphragm 7 and simultaneously on the piston 37. As a result the valve stem 5 raises under the influence of the spring 9 tending to again open the valve 3. Simultaneously the tension of the spring 42 behind the piston 47 exerts itself to move such piston and the piston rod 32, together with the bracket 30, to the left in Figure 2. This movement of the bracket 30 causes the link 28 to rock to the left on the pivot 27, thus moving the valve stem 44 to the left to bring the valve 53 again over the ports 56 and 58 to close them. This action is repeated so long as the float continues to move downwardly with the lowering liquid level of the tank 11.

It will be obvious that whenever the valve 53 closes the ports 56 and 58 the piston 37 and the valve 3 do not move until the float again changes its position in response to liquid level changes.

With the construction above described, it will be apparent that no packing is necessary for the piston 37 or the piston rod 36 for if any leak should occur between the chamber 57 and the chamber 38, such leak would pass through the port 48 directly into the exhaust chamber 47 and the piston 37 under influence of spring 42 moves to the left, resulting in the bracket 30 rocking the link 28 to the left on pivot 27 which in turn would cause valve stem 44 to move to the left whereupon the valve 53 would uncover ports 56 and 58 whereby the leakage in pressure would be compensated for. This is an important feature and it simplifies the construction to the extent of eliminating the usual packing required for sliding members such as the piston 37 and rod 32.

Thus it will be seen that I have provided a valve controlling means which operates as a pilot valve to automatically adjust and maintain the position of the main valve in a pressure or fluid flow line and which operates smoothly and evenly step by step rather than to completely close or completely open the main valve, at each operation.

It will be understood, of course, that the movement of the link 28 may be produced by suitable pressure means rather than liquid level controlled means and the same result accomplished.

Other changes may be made by way of detailed construction and operation without departing from the spirit and scope of my invention. I do not limit myself, therefore, to the exact form herein shown and described other than by the appended claims.

I claim:

1. In combination, a main valve, pressure actuated means for adjusting the position of said valve in accordance with a condition being controlled, a secondary pressure actuated controlling means, a pressure line communicating with both of said means, an exhaust line communicating with both of said means, a slidable pilot valve controlling both of said communications, a condition sensitive element, a floating link providing a connection between said condition sensitive element, said secondary means and said pilot valve, said link being operative to actuate said pilot valve to alternatively open and close either of said communications whereby to adjust the position of said main valve, a casing for said pilot valve and communications, and a removable hollow bushing in said casing within which said pilot valve is slidable.

2. In combination, a main valve, pressure actuated means for adjusting the position of said valve in accordance with a condition to be controlled, a pressure line communicating with said means, an exhaust line communicating with said means, a pilot valve in said line controlling said communications, a secondary pressure actuated means responsive to pressure operative upon said first pressure actuated means, a condition sensitive element, a pivotal connection between said element and said pilot valve whereby said valve is actuated in one direction upon a change of condition, and a pivotal connection between said secondary pressure actuated means and said pilot valve whereby said secondary pressure actuated means is operative to actuate said pilot valve in return direction.

3. In combination, a main valve, pressure actuated means for adjusting the position of said valve in accordance with a condition to be controlled, a pressure line communicating with said means, a pilot valve in said line controlling said communication, a secondary pressure actuated means responsive to pressure operative upon said first pressure actuated means, a condition responsive element, a link connected at one end to said element and at its other end to said pilot valve, and said secondary pressure actuated means being connected to said link intermediate the ends thereof.

4. In combination, a main valve, pressure actuated means for adjusting the position of said valve in accordance with a condition to be controlled, a pressure line communicating with said means, a pilot valve in said line controlling said communication, a secondary pressure actuated means responsive to pressure operative upon said first pressure actuated means, a condition sensitive element, a link mounted for rocking movement and connecting the pilot valve and said secondary pressure actuated means, and a connection between said element and said link.

HUGO BRISACHER.